United States Patent
Hamano et al.

(10) Patent No.: US 7,754,845 B2
(45) Date of Patent: Jul. 13, 2010

(54) PRODUCTION METHOD OF AROMATIC POLYCARBONATE

(75) Inventors: Toshiyuki Hamano, Mie (JP); Ryuuji Uchimura, Fukuoka (JP); Kazuyuki Takahashi, Kitakyushu (JP); Masaaki Miyamoto, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 14 days.

(21) Appl. No.: 12/064,343

(22) PCT Filed: May 22, 2007

(86) PCT No.: PCT/JP2007/060462

§ 371 (c)(1),
(2), (4) Date: Feb. 21, 2008

(87) PCT Pub. No.: WO2008/012986

PCT Pub. Date: Jan. 31, 2008

(65) Prior Publication Data

US 2008/0234445 A1 Sep. 25, 2008

(30) Foreign Application Priority Data

Jul. 25, 2006 (JP) ............... 2006-202042
Aug. 4, 2006 (JP) ............... 2006-212971

(51) Int. Cl.
*C08G 64/00* (2006.01)
*C08G 63/02* (2006.01)

(52) U.S. Cl. ............ 528/196; 422/129; 422/131; 422/132; 422/232; 526/64; 526/65; 526/106; 526/112; 526/113; 528/198

(58) Field of Classification Search ............ 422/129, 422/131, 132, 232; 526/64, 65, 106, 112, 526/113; 528/196, 198
See application file for complete search history.

(56) References Cited

U.S. PATENT DOCUMENTS 3,511,615 A * 5/1970 Roget et al. ............... 422/189
5,359,117 A * 10/1994 Totani et al. ............... 558/268

FOREIGN PATENT DOCUMENTS

| JP | 5 239334 | 9/1993 |
|---|---|---|
| JP | 6 65365 | 3/1994 |
| JP | 6 65366 | 3/1994 |
| JP | 10 330474 | 12/1998 |
| JP | 2000 198839 | 7/2000 |
| JP | 2001 200047 | 7/2001 |
| JP | 2003 34719 | 2/2003 |
| JP | 2003 34720 | 2/2003 |
| JP | 2003 192782 | 7/2003 |
| JP | 2004 26916 | 1/2004 |

OTHER PUBLICATIONS

U.S. Appl. No. 12/519,205, filed Jun. 15, 2009, Takahashi, et al.
U.S. Appl. No. 12/522,720, filed Jul. 10, 2009, Uchimura, et al.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

The object of the present invention is to provide a production method of a high molecular weight aromatic polycarbonate containing a reduced amount of a high melting point product, and having less thermal history received and excellent hue by a melt process. The present invention relates to a production method of an aromatic polycarbonate, characterized in that in producing an aromatic polycarbonate using an aromatic dihydroxy compound and a carbonic diester as raw materials and using plural reactors, a molten reactant temperature T1 (° C.) in at least one reactor A and a molten reactant temperature T2 (° C.) in a reactor B subsequent to the reactor A are satisfied with the relationship of T2<T1, and an evaporation surface area per unit treatment amount of a molten reactant in the reactor to which a molten reactant having a limiting viscosity of 0.1 dl/g or more is supplied is 1.0 $m^2 \cdot hr/m^3$ or more.

20 Claims, 1 Drawing Sheet

[FIG. 1]
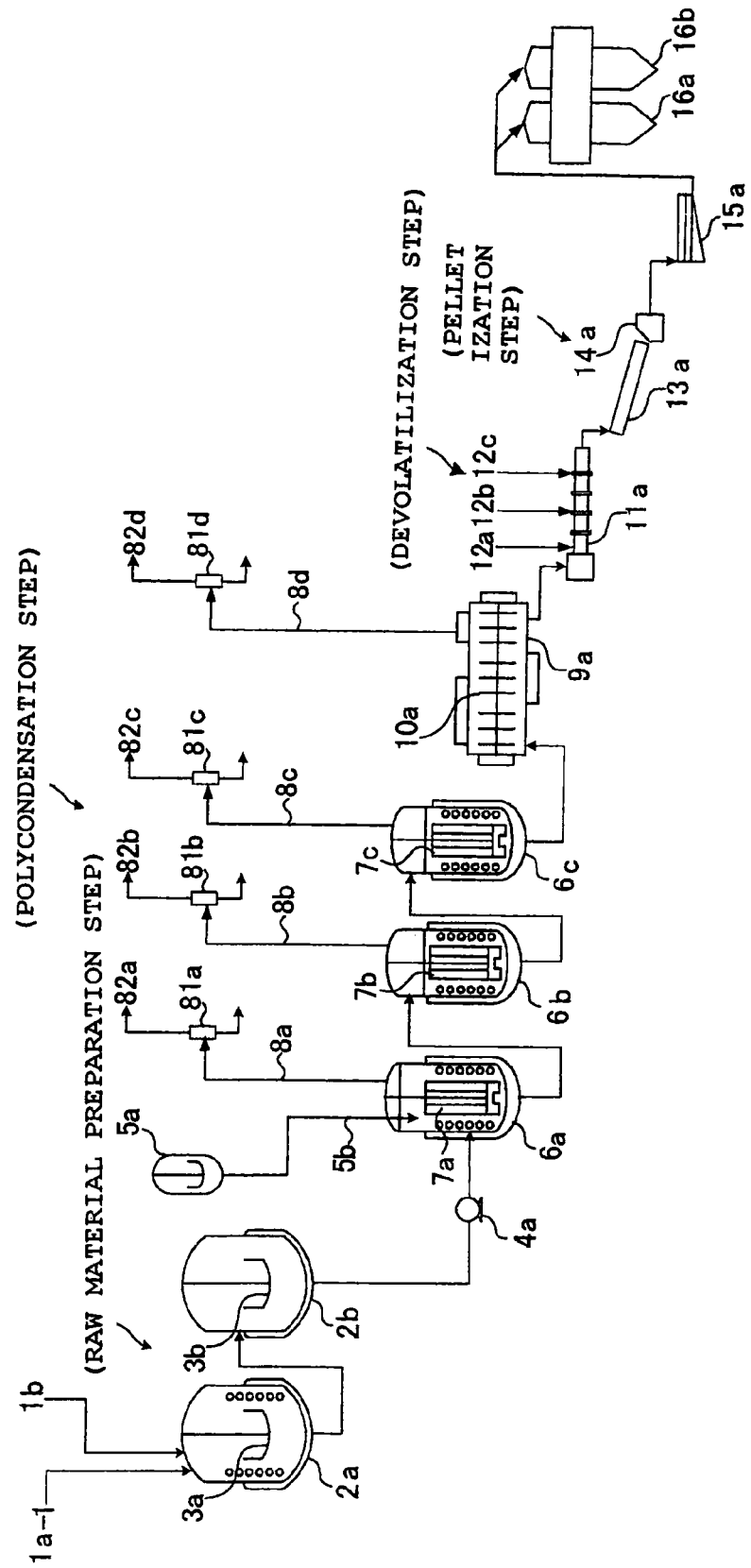

PRODUCTION METHOD OF AROMATIC POLYCARBONATE

TECHNICAL FIELD

The present invention relates to a production method of an aromatic polycarbonate.

BACKGROUND ART

Aromatic polycarbonates have excellent mechanical properties such as impact strength, heat resistance, transparency and the like, and are widely used to applications such as various machine parts, optical discs and automobile parts.

A method of directly reacting bisphenols such as bisphenol A and phosgene (interfacial method) and a method of polycondensation reacting bisphenols such as bisphenol A and carbonic diesters such as diphenyl carbonate by an ester exchange reaction (melt process) are known as production methods of such aromatic polycarbonates. Above all, the melt process by an ester exchange reaction has the advantage that polycarbonates can be produced inexpensively as compared with the interfacial method.

By the way, polycondensation reaction between an aromatic dihydroxy compound and a carbonic diester by a melt process is generally conducted using a multi-stage reactor in the presence of an ester exchange catalyst (see Patent Document 1).

Further, many examples are hitherto reported on aromatic polycarbonates by a melt process. For example, there are a method in which temperature difference between a polymer temperature and a heating medium in a reactor is 100° C. or less when a limiting viscosity [η] of an aromatic polycarbonate formed is 0.2 or less, the temperature difference is 80° C. or less when [η] exceeds 0.2 and is 0.35 or less, and the temperature difference is 50° C. or less when [η] exceeds 0.35 (see Patent Document 2); a method of automatically controlling a polymer viscosity at the outlet of a final reactor by changing temperature or pressure of reactors according to programs previously installed, based on the measurement values (see Patent Document 3); and a method in which difference between outer wall surface temperature of a piping which transfers a molten polymer having high molecular weight and temperature of a molten polymer in a polymerization vessel is in a range of from –3° C. to 50° C. (see Patent Document 4).

Further, there are a method of transferring an aromatic dihydroxy compound and a diaryl carbonate having been subjected to vacuum substitution using an inert gas to a raw material dissolving and mixing tank heated to 115 to 220° C. to adjust a rate of reaction to a range of from 5 to 95% and then transferring the mixture to a post-step, followed by polymerizing (see Patent Document 5 and Patent Document 6); a method of preparing a polycarbonate prepolymer, passing a step of controlling a hydroxyl group terminal ratio of plural prepolymers, and simultaneously continuously producing plural polycarbonates having different molecular weight in a post-polymerization step (see Patent Document 7); and a production method which combines one first polymerization step and plural later polymerization steps (see Patent Document 8).

Further, there is a production method in which surface temperature of a reactor material is controlled to a temperature of 230° C. or higher, thereby suppressing crystallization of a low-order polycondensate of a polycarbonate formed in the course of a polycondensation reaction (see Patent Document 9).

A melt process generally involves an operation of setting operation conditions of a reactor to higher temperature and vacuum conditions as increasing stages to effectively remove phenol by-produced, thereby increasing the degree of polymerization of a polymer formed. Further, to avoid hue of a polymer from deteriorating, it is required to decrease thermal history received as possible and to remove phenol by-produced in a short period of time.

From the above standpoints, the present applicant reported a method of producing a high molecular weight aromatic polycarbonate having excellent hue by controlling an average residence time of a molten reactant in each reactor and stirring powder per unit volume of a molten reactant when producing an aromatic polycarbonate using a production apparatus comprising a plurality of vertical reactors and at least one horizontal reactor, connected in series (see Patent Document 10).

Patent Document 1: JP-A-05-239334

Patent Document 2: JP-A-06-065365

Patent Document 3: JP-A-06-065366

Patent Document 4: JP-A-10-330474

Patent Document 5: JP-A-2003-034719

Patent Document 6: JP-A-2003-034720

Patent Document 7: JP-A-2003-192782

Patent Document 8: JP-A-2004-026916

Patent Document 9: JP-A-2000-198839

Patent Document 10: JP-A-2001-200047

DISCLOSURE OF THE INVENTION

Problems that the Invention is to Solve

By the way, when an aromatic polycarbonate is produced using a production apparatus comprising a plurality of vertical reactors connected in series, a polymer scattered and/or adhered to a gas phase part or the like of a reactor receives thermal history to possibly form a high melting point product in a reactor connected at a later stage for the reason, for example, that self-washing properties lack by the decrease of a reflux amount during continuous operation in a long period of time.

Contamination of a molten reactant with such a high melting point product causes the generation of problems such that a gear pump which draws out a molten reactant clogs and an aromatic polycarbonate product is contaminated with foreign matters. Therefore, the countermeasure to those problems is required.

Further, according to the detailed investigations by the present inventors, it is clarified that in the production of an aromatic polycarbonate using a production apparatus comprising a plurality of vertical reactors and horizontal reactors, connected in series, rejection efficiency of by-produced phenol in vertical reactors at the later polymerization stage is not sufficient by only the control of a residence time and a stirring power, and as a result, there is the tendency that the progress of a polycondensation reaction is disturbed.

The present invention has been made to solve those problems in the production of an aromatic polycarbonate by a melt process.

That is, one object of the present invention is to provide a production method of an aromatic polycarbonate containing a reduced amount of a high melting point product, in the production of an aromatic polycarbonate by a melt process.

Another object of the present invention is to provide a production method of a high molecular weight aromatic polycarbonate having less thermal history received and excellent hue, by a melt process.

Means for Solving the Problems

According to the present invention, the following (1) to (12) are provided.

(1) A production method of an aromatic polycarbonate, characterized in that in producing an aromatic polycarbonate using an aromatic dihydroxy compound and a carbonic diester as raw materials and using plural reactors, a molten reactant temperature T1 (° C.) in at least one reactor A and a molten reactant temperature T2 (° C.) in a reactor B subsequent to the reactor A are satisfied with the following formula (1):

$$T2<T1 \quad \text{Formula (1)}$$

(2) The production method of an aromatic polycarbonate in (1), characterized in that the molten reactant temperature (T1) (° C.) and the molten reactant temperature T2 (° C.) are further satisfied with the following formula (2):

$$260° C.<T2<T1<280° C. \quad \text{Formula (2)}$$

(3) The production method of an aromatic polycarbonate in (1) or (2), characterized in that at least one reactor in the plural reactors is a vertical reactor.

(4) The production method of an aromatic polycarbonate in any one of (1) to (3), characterized in that the reactor A is a vertical reactor.

(5) The production method of an aromatic polycarbonate in any one of (1) to (4), characterized in that the vertical reactor is connected to the end of the plural reactors connected in series, and the reactor subsequent to the vertical reactor is a horizontal reactor.

(6) The production method of an aromatic polycarbonate in any one (1) to (5), characterized in that a polymer in the reactor A has a viscosity average molecular weight of from 4,000 to 14,000.

(7) A production method of an aromatic polycarbonate which is a method of producing an aromatic polycarbonate by melt polycondensing with an ester exchange reaction using an aromatic dihydroxy compound and a carbonic diester as raw materials and using a plurality of reactors equipped with a stirring device, and is characterized in that an evaporation surface area per unit treatment amount of a molten reactant in the reactor to which a molten reactant having a limiting viscosity of 0.1 dl/g or more is supplied is $1.0 \, m^2 \cdot hr/m^3$ or more.

(8) A production method of an aromatic polycarbonate, wherein at least one of the reactors is a vertical reactor, and at least one of the vertical reactors is satisfied with the condition described in (7).

(9) The production method of an aromatic polycarbonate in (7), characterized in that the vertical reactor is further satisfied with the following conditions (1) and (2):

(1) an average residence time of a molten reactant in the reactor is within 120 minutes, and (2) a stirring power per unit volume added to a molten reactant in the reactor is $2.0 \, kW/m^3$ or more.

(10) The production method of an aromatic polycarbonate in (7), characterized in that the reactors comprise a plurality of the vertical reactors connected in series, and at least one horizontal reactor subsequent to the vertical reactor.

(11) The production method of an aromatic polycarbonate in (9), characterized in that the average residence time of the molten reactant in the horizontal reactor is within 120 minutes, and an evaporation surface area per unit treatment amount of the molten reactant in the horizontal reactor is $4.0 \, m^2 \cdot hr/m^3$ or more.

(12) The production method of an aromatic polycarbonate in (1) or (7), characterized in that the aromatic polycarbonate obtained has a viscosity average molecular weight of 10,000 or more.

ADVANTAGE OF THE INVENTION

According to the present invention, an aromatic polycarbonate having a reduced amount of a high melting point product can be produced. Further, a high molecular weight aromatic polycarbonate having excellent hue can be produced by a melt process.

BRIEF DESCRIPTION OF THE DRAWING

FIG. 1 is a view showing one example of a production apparatus of an aromatic polycarbonate.

DESCRIPTION OF REFERENCE NUMERALS AND SIGNS

2a . . . First raw material mixing tank
2b . . . Second raw material mixing tank
3a, 3b . . . Anchor type stirring blade
4a . . . Raw material supply pump
5a . . . Catalyst solution tank
5b . . . Catalyst introduction pipe
6a . . . First vertical reactor
6b . . . Second vertical reactor
6c . . . Third vertical reactor
7a, 7b, 7c . . . MAXBLEND blade
8a, 8b, 8c, 8d . . . Distillation pipe
9a . . . Fourth horizontal reactor
10a . . . Lattice-type blade
11a . . . Extruder
12a, 12b, 12c . . . Additive supply port
13a . . . Strand bath
14a . . . Strand cutter
15a . . . Centrifugal dehydrator
16a, 16b . . . Product silo
81a, 81b, 81c, 81d . . . Condenser
82a, 82b, 82c, 82d . . . Pressure reducing device

BEST MODE FOR CARRYING OUT THE INVENTION

The best mode for carrying out the invention (hereinafter, the embodiment of the invention) is described in detail below. The present invention is not limited to the following embodiments, and can be carried out with various modifications within a scope of its gist. Further, the drawings used are to explain the present embodiment, and do not show the actual size.

(Aromatic Polycarbonate)

In the present invention, an aromatic polycarbonate is produced by polycondensation based on an ester exchange reaction between an aromatic dihydroxy compound and a carbonic diester.

A method of producing an aromatic polycarbonate by continuously conducting polycondensation reaction using an aromatic dihydroxy compound and a carbonic diester as raw materials in the presence of an ester exchange catalyst is described below.

(Aromatic Dihydroxy Compound)

The aromatic dihydroxy compound used in the present embodiment includes a compound represented by the following general formula (1).

[Chem. 1]

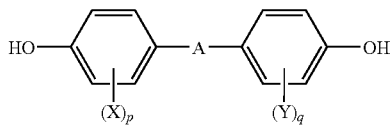

General Formula (1)

In the general formula (1), A represents a single bond, a straight-chain, branched or cyclic divalent hydrocarbon group having from 1 to 10 carbon atoms which may be substituted, or a divalent group represented by —O—, —S—, —CO— or —SO$_2$—. X and Y represent a halogen atom or a hydrocarbon group having from 1 to 6 carbon atoms. p and q are an integer of 0 or 1. X and Y, and p and q may be the same or different, respectively.

Specific examples of the aromatic dihydroxy compound include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)cyclohexane; biphenols such as 4,4'-dihydroxybiphenyl and 3,3',5,5'-tetramethyl-4,4'-dihydroxybiphenyl; bis(4-hydroxyphenyl)sulfone, bis(4-hydroxyphenyl)sulfide, bis(4-hydroxyphenyl)ether, and bis(4-hydroxyphenyl)ketone.

Of those, 2,2-bis(4-hydroxyphenyl)propane (bisphenol A, hereinafter sometimes abbreviated as BPA) is preferable. Those aromatic dihydroxy compounds can be used alone or as mixtures of two or more thereof.

(Carbonic Diester)

The carbonic diester used in the present embodiment includes a compound represented by the following general formula (2).

[Chem. 2]

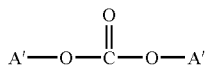

General Formula (2)

In the general formula (2), A' represents a straight-chain, branched or cyclic monovalent hydrocarbon group having from 1 to 10 carbon atoms which may be substituted. Two A's may be the same or different.

Specific examples of the carbonic diester include diphenyl carbonate, a substituted diphenyl carbonate such as ditolyl carbonate; dimethyl carbonate, diethyl carbonate and di-t-butyl carbonate.

Of those, diphenyl carbonate (hereinafter sometimes abbreviated as DPC) and a substituted diphenyl carbonate are preferable. Those carbonic diesters can be used alone or as mixtures of two or more thereof.

The carbonic diester may be replaced by dicarboxylic acid or dicarboxylic ester in an amount of preferably 50 mol % or less, and more preferably 30 mol % or less.

The representative dicarboxylic acid or dicarboxylic ester includes terephthalic acid, isophthalic acid, diphenyl terephthalate and diphenyl isophthalate. When such a dicarboxylic acid or dicarboxylic ester is co-used, a polyester carbonate is obtained.

Those carboxylic diesters (including the above replaced dicarboxylic acid or dicarboxylic ester, and hereinafter the same) are used in an amount excess to the dihydroxy compound.

Specifically, the carboxylic diester is used in a molar ratio of generally from 1.01 to 1.30, and preferably from 1.02 to 1.20, to the aromatic dihydroxy compound. Under the same reaction conditions, there is the tendency that reaction rate increases as the molar ratio decreases, thereby increasing a viscosity average molecular weight of the aromatic polycarbonate. Further, when the molar ratio increases in this range, reaction rate decreases, and there is the tendency that the viscosity average molecular weight decreases.

Where the molar ratio is excessively small, the amount of terminal OH group of a polycarbonate obtained by polycondensation increases, and reactivity becomes high, but thermal stability, hydrolysis resistance and the like tend to deteriorate. Further, where the molar ratio is excessively large, there is the tendency that it is difficult to produce an aromatic polycarbonate having the desired molecular weight.

(Ester Exchange Catalyst)

The ester exchange catalyst used in the present embodiment includes catalysts generally used in producing a polycarbonate by an ester exchange method, and is not particularly limited. In general, examples of the catalyst include basic compounds such as an alkali metal compound, a beryllium or magnesium compound, an alkaline earth metal compound, a basic boron compound, a basic phosphorus compound, a basic ammonium compound, and an amine compound.

Of those ester exchange catalysts, an alkali metal compound is practically desirable. Those ester exchange catalysts may be used alone or as mixtures of two or more thereof.

The ester exchange catalyst is used in a range of from generally from $1\times10^{-9}$ to $1\times10^{-1}$ mol, and preferably from $1\times10^{-7}$ to $1\times10^{-2}$ mol, per mole of the aromatic dihydroxy compound.

The alkali metal compound includes inorganic alkali metal compounds such as hydroxides, carbonates and hydrogen carbonate compounds of alkali metals; and organic alkali metal compounds such as salts of alkali metal salts with alcohols, phenols or organocarboxylic acids. Examples of the alkali metal include lithium, sodium, potassium, rubidium and cesium.

Of those alkali metal compounds, a cesium compound is preferable, and cesium carbonate, cesium hydrogen carbonate and cesium hydroxide are particularly preferable.

Examples of the beryllium or magnesium compound and the alkaline earth metal compound include inorganic alkaline earth metal compounds such as hydroxides or carbonates of beryllium, magnesium and alkaline earth metals; and salts of those metals and alcohols, phenols and organocarboxylic acids. Examples of the alkaline earth metal include calcium, strontium and barium.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

(Production Method of Aromatic Polycarbonate)

A production method of an aromatic polycarbonate is described below.

The production of an aromatic polycarbonate is conducted by preparing a mixture in the desired molar ratio of an aromatic dihydroxy compound and a carbonic diester compound as raw materials (raw material preparation step) and subjecting those compounds to a multi-stage polycondensation reaction in the presence of an ester exchange reaction catalyst under a molten state using plural reactors (polycondensation step). The reaction method may be any of a batchwise method, a continuous method, and a combination of a batchwise method and a continuous method. The reactors used comprise a plurality of vertical reactors and the subsequent at least one horizontal reactor. In general, those reactors are arranged in series, and treatment is conducted continuously.

After the polycondensation step, unreacted raw materials and reaction by-products in a molten reactant are removed (devolatilization step), and the aromatic polycarbonate cooled is formed into pellets having a given particle size (pelletization step).

Each step of the production method is described below.

(Raw Material Preparation Step)

An aromatic dihydroxy compound and a carbonic diester used as raw materials of an aromatic polycarbonate are generally prepared as a molten mixture using a batchwise, semi-batchwise or continuous stirring tank type apparatus in an atmosphere of an inert gas such as nitrogen or argon. For example, in the case of using bisphenol A as the aromatic dihydroxy compound and diphenyl carbonate as the carbonic diester, temperature of the molten mixture is selected from a range of generally from 20 to 180° C., and preferably from 125 to 160° C.

In this case, proportions of the aromatic dihydroxy compound and the carbonic diester are adjusted such that the carbonic diester is excess, and are adjusted such that the carbonic diester is in a proportion of generally from 1.01 to 1.30 mol, and preferably from 1.02 to 1.20 mol, per mole of the aromatic dihydroxy compound.

(Polycondensation Step)

Polycondensation by an ester exchange reaction between the aromatic dihydroxy compound and the carbonic diester is continuously conducted by a multi-stage step of generally 2 stages or more, and preferably from 3 to 7 stages. Specific reaction conditions are that temperature is in a range of from 150 to 320° C., pressure is in a range of from normal pressures to 0.01 Torr ($1.33 \times 10^{-3}$ kPa), and an average residence time is in a range of from 5 to 180 minutes.

In each reactor in a multi-stage step, further high temperature and further high vacuum are generally set stepwise within the above reaction conditions in order to effectively discharge phenol by-produced with the progress of the polycondensation reaction. It is preferable to set temperature as low as possible and a residence time as short as possible to prevent deterioration of quality such as hue of the aromatic polycarbonate obtained.

In the present embodiment, the average residence time is 120 minutes or less, and preferably 90 minutes or less.

In polycondensation by a multi-stage step, generally a plurality of vertical reactors each having a stirring blade are connected in series, and a horizontal reactor is provided as a final step, thereby increasing an average molecular weight of an aromatic polycarbonate. The vertical reactors provided are generally 2 to 5, and preferably 3 to 4.

The vertical reactor used herein means that an axis of rotation of a stirring blade is vertical (perpendicular direction). Shape of the vertical reactor used is that a ratio (L/D) of length L of a straight body part to an inner diameter D of a reaction tank is 3 or less, and preferably 0.5 to 3. Length L of the straight body part of a reactor means a length between two tangent lines when the shape of the reactor is a cylindrical double mirror, and means a distance between a tangent line of one side of a side body part and an edge face of another side when the upper portion or lower portion of the reactor is a flat cover structure. The inner diameter D of the reactor means a distance at a region which is filled with a molten liquid.

Examples of the type of the stirring blade in the vertical reactor include a turbine blade, paddle blade, a fardler blade, an anchor blade, a FULLZONE blade (manufactured by Shinko Pantek Co., Ltd.), a sanmeler blade (manufactured by Mitsubishi Heavy Industries, Ltd.), a MAXBLEND blade (manufactured by Sumitomo Heavy Industries, Ltd.), a helicalribbon blade, and a lattice-type twisting blade (manufactured by Hitachi, Ltd.).

Further, the horizontal reactor means a reaction tank that an axis of revolution of a stirring blade is horizontal (horizontal direction). Examples of the stirring blade in the horizontal reaction tank include single shaft stirring blades such as a disc type and a paddle type, and two-shaft stirring blades such as HVR, SCR and N-SCR (manufactured by Mitsubishi Heavy Industries, Ltd.), Bivolac (manufactured by Sumitomo Heavy Industries, Ltd.), and a spectacle-shaped blade and a lattice-type blade (manufactured by Hitachi, Ltd.).

The ester exchange catalyst used in polycondensation of the aromatic dihydroxy compound and the carbonic diester compound is generally previously provided as an aqueous solution. Concentration of the catalyst aqueous solution is not particularly limited, and adjusted to an optional concentration according to solubility of a catalyst in water. Other organic solvent such as acetone, alcohol, toluene or phenol can be used in place of water.

Properties of water used for dissolution of the catalyst are not particularly limited so far as kind and concentration of impurities contained are constant. In general, distilled water, deionized water and the like are preferably used.

(Devolatilization Step)

After the polycondensation step, unreacted raw materials, an ester exchange catalyst, a monohydroxy compound by-produced in an ester exchange reaction, and a low molecular weight compound such as a polycarbonate oligomer in a molten reactant are removed in a devolatilization step. The devolatilization treatment is generally conducted continuously by a bent type extruder.

The extruder can use any type of extruder so far as it is equipped with a bent part, and is not particularly limited. Examples of the extruder include bent type single-screw or multi-screw extruders. In particular, a mating type twin-screw extruder is preferable. Rotating direction of the axis of the extruder may be the same direction rotation or the different direction rotation. The number of bent is generally multiple bents of from 2 to 10.

In the devolatilization step, it is preferable to neutralize and/or deactivate the residual basic ester exchange catalyst in the aromatic polycarbonate after the polycondensation reaction with an acidic compound or its derivatives. This can suppress a side-reaction during devolatilization, and remove residual unreacted raw materials and hydroxy compound.

The acidic compound or its derivatives added in the devolatilization step can use any compounds so far as it neutralizes a basic ester exchange catalyst, and is not particularly limited. Examples of the compound include Brønsted acids such as hydrochloric acid, nitric acid, boric acid, sulfuric acid, sulfurous acid, phosphoric acid, phosphorous acid, hypophosphorous acid, polyphosphoric acid, adipic acid, ascorbic acid, asparatic acid, azelaic acid, adenosine phosphate, benzoic acid, formic acid, valeric acid, citric acid, glycolic acid, glutamic acid, glutaric acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid; and esters thereof. Of those acidic compounds or derivatives thereof, sulfonic acids or esters thereof are preferable, and above all, p-toluenesulfonic acid, methyl p-toluenesulfonate and butyl p-toluenesulfonate are particularly preferable.

A solvent which dissolves the acidic compound or its derivatives is not particularly limited so far as it dissolves the acidic compound or its derivatives. Above all, water is preferable. A water-insoluble acidic compound or its derivatives can use a mixed solvent of water and an organic solvent such as acetone added thereto. Those acidic compounds or derivatives thereof are added in a range of from 0.1 to 50 times, and preferably from 0.5 to 30 times, per the neutralization equivalent of the basic ester exchange catalyst used in the polycondensation reaction.

When an extruder equipped with multistage bend ports is used in the devolatilization step, the acidic compound or its derivative is added short of the bent port nearest a resin supply port. Embodiments of the aromatic polycarbonate subjected to a neutralization devolatilization treatment by the extruder include a method of introducing into the extruder and treating, during a molten state just after polymerization, and a method of once cooling and solidifying, and then introducing into an extruder and treating.

(Pelletization Step)

The strand-shaped polycarbonate discharged from the extruder in the devolatilization step is generally pelletized by a strand cutter through a strand bath, subjected to water removal by centrifugal dehydrator or the like, and then placed in a product silo.

(Production Apparatus)

The production method of an aromatic polycarbonate to which the present embodiment is applied is specifically described below based on the Drawing.

FIG. 1 is a view showing one example of a production apparatus of an aromatic polycarbonate. In the production apparatus shown in FIG. 1, an aromatic polycarbonate is produced through a raw material preparation step which prepares a mixture containing an aromatic dihydroxy compound and a carbonic diester as raw materials, and a polycondensation step which conducts polycondensation reaction of those raw materials in a molten state using plural reactors, and subsequently through a devolatilization step which removes unreacted raw materials and reaction by-products in a molten reactant, and a pelletization step, thereby producing pellets of the aromatic polycarbonate.

A first raw material mixing tank 2a and a second raw material mixing tank 2b connected in series, and a raw material supply pump 4a for supplying the raw materials prepared to a polycondensation step are provided in the raw material preparation step. For example, anchor type stirring blades 3a and 3b are provided in the first raw material mixing tank 2a and the second raw material mixing tank 2b, respectively.

Further, to the first raw material mixing tank 2a, diphenyl carbonate (hereinafter, sometimes referred to as DPC) as the carbonic diester is supplied in a molten state from a DPC supply port 1a-1, and bisphenol A as the aromatic dihydroxy compound is supplied in a powder state from a BPA supply port 1b.

A first vertical reactor 6a, a second vertical reactor 6b and a third vertical reactor 6c which are connected in series, and a fourth horizontal reactor 9a connected to the subsequent stage of the third vertical reactor 6c in series are provided in the polycondensation step. MAXBLEND blades 7a, 7b and 7c are provided in the first vertical reactor 6a, the second vertical reactor 6b and the third vertical reactor 6c, respectively. Further, a lattice-type blade 10a is provided in the fourth horizontal reactor 9a.

A catalyst dissolution tank 5a which previously prepares an ester exchange catalyst, and a catalyst introduction pipe 5b for supplying the ester exchange catalyst prepared in the catalyst dissolution tank 5a to the first vertical reactor 6a are further provided.

Further, distillation pipes 8a, 8b, 8c and 8d for discharging by-products or the like formed by polycondensation reaction are fitted to four reactors, respectively. The distillation pipes 8a, 8b, 8c and 8d are connected to condensers 81a, 81b, 81c and 81d, respectively, and each reactor is maintained in a given reduced pressure state by pressure reducing devices 82a, 82b, 82c and 82d.

An extruder 11a having additive supply ports 12a, 12b and 12c is provided in the devolatilization step.

A strand bath 13a which cools a strand-shaped polycarbonate discharged from the extruder 11a, a strand cutter 14a which cuts the cooled strand to a given particle size, a centrifugal dehydrator 15a for removing water in pellets, and product silos 16a and 16b in which dried pellets are placed are provided in the pelletization step.

In the production apparatus of an aromatic polycarbonate shown in FIG. 1, a DPC melt prepared at a given temperature in a nitrogen gas atmosphere and a BPA powder weighed in a nitrogen gas atmosphere are continuously supplied to the first raw material mixing tank 2a from the DPC supply port 1a-1 and the BPA supply port 1b, respectively. When liquid level of the first raw material mixing tank 2a exceeds the same level as the maximum level in a transfer piping, the mixture of raw materials is transferred to the second raw material mixing tank 2b.

Next, the mixture of raw materials is continuously supplied to the first vertical reactor 6a through the raw material supply pump 4a.

Further, cesium carbonate in a form of an aqueous solution as an ester exchange catalyst is continuously supplied to the first vertical reactor 6a from the catalyst dissolution tank 5a by the catalyst introduction pipe 5b.

The first vertical reactor 6a keeps, for example, a temperature of 220° C., a pressure of 13.33 kPa (100 Torr) and the number of revolutions of blade of 160 rpm in a nitrogen atmosphere, and maintains liquid level constant such that the average residence time is 60 minutes while distilling by-produced phenol from the distillation pipe 8a, and polycondensation reaction is conducted. Next, a molten reactant discharged from the first vertical reactor 6a is then continuously supplied to the second vertical reactor 6b, the third vertical reactor 6c and the fourth horizontal reactor 9a successively, and polycondensation reaction proceeds. Reaction conditions in each reactor are respectively set to be high temperature, high vacuum and low stirring rate with the progress of polycondensation reaction. During the polycondensation reaction, the liquid level is controlled such that the average residence time in each reactor is, for example, about 60 minutes, and further, in each reactor, by-produced phenol is distilled from the distillation pipes 8b, 8c and 8d.

In the present embodiment, by-products such as phenol are continuously liquefied and recovered from the condensers 81a and 81b fitted to the first vertical reactor 6a and the second vertical reactor 6b, respectively. Further, cold traps (not shown) are provided in the condensers 81c and 81d fitted to the third vertical reactor 6c and the fourth horizontal reactor 9a, respectively, and by-products are continuously liquefied and recovered.

Next, the polycarbonate drawn out of the fourth horizontal reactor 9a is supplied in a molten state to a twin-screw extruder 11a equipped with three stage bent portions. For example, various additives such as butyl p-toluenesulfonate, tris(2,4-di-t-butylphenyl)phosphite and stearic acid monoglyceride are supplied to the extruder 11a from the additive supply ports 12a, 12b and 12c, respectively. The conditions of the extruder 11a are set to, for example, a discharge amount of 50 kg/hr, the number of revolutions of 150 rpm and the maximum resin temperature of about 278° C.

The strand-shaped polycarbonate discharged from the extruder 11a is passed through the strand bath 13a and pelletized with the strand cutter 14a, and after removal of water with the centrifugal dehydrator 15a, the pellets are introduced into the product silos 16a and 16b.

In the present embodiment, the production of an aromatic polycarbonate is conducted under the condition satisfying the relationship of the following formula (1) when polycondensation reaction is conducted in at least the third vertical reactor 6c connected at the end among three vertical reactors (the first vertical reactor 6a, the second vertical reactor 6b and the third vertical reactor 6c) connected in series, and the fourth horizontal reactor 9a subsequent thereto, in the production apparatus shown in FIG. 1.

$$T2<T1 \qquad \text{Formula (1)}$$

In the formula (1), T1 is a molten reactant temperature (unit: ° C.) in the third vertical reactor 6c, and T2 is a molten reactant temperature (unit: ° C.) in the fourth horizontal reactor 9a.

When the molten reactant temperature T1 in the third vertical reactor 6c is set to a temperature higher than the molten reactant temperature T2 in the fourth horizontal reactor 9a (T2<T1), generation of a high melting point product in the third vertical reactor 6c can be reduced, and stable production operation can be conducted. Additionally, foreign matters introduced in an aromatic polycarbonate product finally obtained are greatly reduced.

In this case, the molten reactant temperature T1 in the third vertical reactor 6c is generally from 240 to 300° C., and preferably from 260 to 280° C. The molten reactant temperature T2 in the fourth horizontal reactor 9a is generally from 240 to 300° C., and preferably from 260 to 280° C.

That is, in the polycondensation in the third vertical reactor 6c and the fourth horizontal reactor 9a subsequent thereto, it is preferable to conduct the production of an aromatic polycarbonate under the condition further satisfying the relationship of the following formula (2).

$$260° \text{ C.}<T2<T1<280° \text{ C.} \qquad \text{Formula (2)}$$

Where the molten reactant temperature T1 in the third vertical reactor 6c is excessively high temperature, there is the tendency that hue of a polymer obtained deteriorates (yellow coloration). Further, where the molten reactant temperature T2 in the fourth horizontal reactor 9a is excessively low temperature, melt viscosity of a polymer is high, resulting in deterioration of flowability. As a result, long residence and/or adhesion in the inside of a reactor are liable to occur, and formation of crystallized foreign matters tends to increase.

In this case, where a viscosity average molecular weight (Mv) of the polymer formed in the third vertical reactor 6c is from about 4,000 to 14,000, it is desirable to conduct operation of an aromatic polycarbonate in the third vertical reactor 6c and the fourth horizontal reactor 9a so as to satisfy the condition of the above-described formula (1) or formula (2). When the viscosity average molecular weight (Mv) of the molten reactant is within the above-described range, the effect of reducing the generation of a high melting point product in the third vertical reactor 6c is large.

The viscosity average molecular weight (Mv) of an aromatic polycarbonate is obtained by the following equation based on a limiting viscosity [η] (unit: dl/g) measured in methylene chloride at 20° C. using Ubbellohde viscometer.

$$[\eta]=1.23\times10^{-4}\times(Mv)^{0.83}$$

The limiting viscosity [η] is an intercept when a linear concentration (C) obtained by plotting a specific viscosity ($\eta_{sp}$/C) of a methylene chloride diluted solution at 20° C. and a concentration (C) of the methylene chloride diluted solution is extrapolated to zero.

When the above-described production conditions are satisfied, an aromatic polycarbonate having a viscosity average molecular weight (Mv) of about 15,000 and excellent hue and suitable as an optical polycarbonate can finally be produced.

Application of the formula (1) or the formula (2) in the third vertical reactor 6c and the fourth horizontal reactor 9a in the production apparatus of an aromatic polycarbonate shown in FIG. 1 is described here in detail. However, the relationship of the formula (1) or the formula (2) is not limited to this combination of reactors, and can be applied to, for example, the polycondensation reaction in the first vertical reactor 6a and the second vertical reactor 6b, and in the second vertical reactor 6b and the third vertical reactor 6c.

In the production method of an aromatic polycarbonate to which the present embodiment is applied, when the production apparatus comprising plural vertical reactors and a horizontal reactor, each being equipped with a stirrer, connected in series is used in the polycondensation step as shown in FIG. 1, it is preferable to conduct the production of an aromatic polycarbonate under the condition of satisfying the relationship of the formula (1) or the formula (2) described above in at least the third vertical reactor 6c connected to the end among three vertical reactors, and the fourth horizontal reactor 9a subsequent thereto.

As shown in FIG. 1, in the present embodiment, the production of an aromatic polycarbonate by an ester exchange reaction is conducted using a production apparatus comprising three vertical reactors each equipped with a stirring blade connected in series, and subsequent to those vertical reactors, one horizontal reactor connected in series.

In particular, the present embodiment has the characteristic that the production of an aromatic polycarbonate in a reactor to which a molten reactant having a limiting viscosity of 0.1 dl/g or more is supplied is satisfied with the condition that an evaporation surface area per unit treatment amount of the molten reactant is $1.0\ m^2 \cdot hr/m^3$ or more, preferably $2.0\ m^2 \cdot hr/m^3$ or more, and more preferably $3.0\ m^2 \cdot hr/m^3$ or more.

Further, it has the characteristic that the reactor is satisfied with the following conditions.

(1) An average residence time of a molten reactant in the reactor is 120 minutes or less, preferably 90 minutes or less, more preferably 75 minutes or less, and further preferably 60 minutes or less.

(2) A stirring power per unit volume (P/V) of a molten reactant in the reactor is $2.0\ kW/m^3$ or more, preferably $2.5\ kW/m^3$ or more, and more preferably $3.0\ kW/m^3$ or more.

The "stirring power per unit volume" used herein means a numerical value (P/V) obtained by dividing a net stirring power (P) for stirring a molten reactant filled in a reactor equipped with a stirring blade by a volume (V) of the molten reactant filled in the reactor. The net stirring power (P) means a numerical value obtained by deducting a stirring power value ($P_0$) under the same operation condition as the operation condition in the state that a molten reactant is not present from a stirring power value ($P_1$) under the operation condition that the reactor is filled with a molten reactant.

In this case, the filling amount of the molten reactant in the vertical reactor is generally such that a ratio of liquid depth of the molten reactant to an inner diameter of the vertical reactor is about 1.5 or less. Further, the reaction temperature is generally set in a range of from 150 to 230° C., and the pressure is generally set in a range of from 760 to 50 Torr.

Further, regarding the number of revolutions of a stirring blade fitted to the vertical reactor, because power properties of stirring vary depending on a blade shape employed, the number of revolutions of the blade is required to set so as to satisfy the stirring power every blade shape or apparatus scale employed.

The "evaporation surface area per unit treatment amount" used herein means a liquid surface area under a static (stirring stop) state in the case of a reactor equipped with a stirring blade, that is, a numerical value (A/F) obtained by dividing a cross-sectional area (A) of a tank by an amount (F) supplied to a reactor. In the case of a horizontal reactor, a product of a blade revolution area and the number of stages of a blade is employed as an evaporation surface area (A), and a numerical value (A/F) obtained by dividing such an evaporation surface area (A) by the unit treatment amount (F) is used.

Where the stirring power per unit volume (P/V) in the above-described vertical reactor is excessively small, surface renewal properties at a gas-liquid interface by stirring flow of a molten reactant becomes insufficient, and removal efficiency of by-produced phenol tends to deteriorate. Therefore, the P/V value is preferably $2.0\ kW/m^3$ or more. However, it was seen that there is an insufficient case with only such a P/V value, and it has been found that the evaporation surface area per unit treatment amount is required to be $1.0\ m^2 \cdot hr/m^3$ or more. Where the evaporation surface area per unit treatment amount (A/F) in the vertical reactor is excessively small, the same tendency appears, and an aromatic polycarbonate having the desired molecular weight may not be obtained.

Even though the stirring power in the horizontal reactor is increased idly, removal of phenol is not always conducted efficiently. Therefore, a value is not particularly specified to the stirring power, and is generally set in a range of from 2 to 15 rpm regardless of an apparatus scale or a blade shape. However, the A/F is preferably $4.0\ m^2 \cdot hr/m^3$ or more in order to improve surface renewal properties.

In the production apparatus of an aromatic polycarbonate comprising three vertical reactors connected in series as shown in FIG. 1, rise of liquid level and entrained amount due to foaming tend to increase in the first vertical reactor 6a at the initial stage of polycondensation reaction or the second vertical reactor 6b. Therefore, it is preferable in the present embodiment to conduct the production of an aromatic polycarbonate by an ester exchange reaction so as to satisfy the above-described conditions (1) to (3) in at least the third vertical reactor 6c connected to the final stage among the three vertical reactors connected in series in the polycondensation step in the production apparatus of an aromatic polycarbonate shown in FIG. 1.

In this case, when the limiting viscosity [η] of the molten reactant supplied to the third vertical reactor 6c is 0.1 dl/g or more, preferably 0.2 dl/g or more and more preferably 0.3 dl/g or more, it is desirable that the production operation of an aromatic polycarbonate in the third vertical reactor 6c is satisfied with the above-described conditions (1) to (3).

When the conditions are satisfied, an aromatic polycarbonate having a viscosity average molecular weight (Mv) of 10,000 or more and excellent hue can be produced.

The present embodiment uses the production apparatus comprising three vertical reactors each equipped with a stirring blade connected in series, and subsequent to those vertical reactors, one horizontal reactor (the fourth horizontal reactor 9a) connected in series, as shown in FIG. 1.

Viscosity of a molten reactant increases at the stage that the molten reactant is discharged from the third vertical reactor 6a provided at the last stage of the three vertical reactors connected in series. The molten reactant is further supplied to the fourth horizontal reactor 9a, and polycondensation reaction is continued therein until an aromatic polycarbonate having the target molecular weight is obtained.

It is preferable that the production of an aromatic polycarbonate in the fourth horizontal reactor 9a connected to the later stage of the third vertical reactor 6c is satisfied with the following conditions.

(a) An average residence time (θ) in the fourth horizontal reactor 9a is within 120 minutes, preferably within 90 minutes, and more preferably within 60 minutes.

(b) An evaporation surface area per unit treatment amount in the fourth horizontal reactor 9a is 4.0 m²·hr/m³ or more, preferably 10 m²·hr/m³ or more, and more preferably 15 m²·hr/m³ or more.

When the reaction in the fourth horizontal reactor 9a is satisfied with the above conditions, an aromatic polycarbonate having a viscosity average molecular weight (Mv) of 10,000 or more and excellent hue can be produced.

The production method of an aromatic polycarbonate by an ester exchange reaction using the production apparatus comprising three vertical reactors and one horizontal reactor connected in series as shown in FIG. 1 is described in detail above. However, the number of the vertical reactor or the horizontal reactor is not particularly limited, and can appropriately be selected according to need.

The present invention is described further specifically based on the Examples. However, the present invention is not limited to the following Examples so far as it does not depart from its gist. Polycarbonates obtained in the Examples and the Comparative Examples were analyzed by the following measurement methods.

(1) Viscosity Average Molecular Weight (Mv) of Aromatic Polycarbonate

The viscosity average molecular weight (Mv) of an aromatic polycarbonate was obtained by measuring a limiting viscosity [η] (unit: dl/g) at 20° C. in methylene chloride using Ubbellohde viscometer, and calculating with the following equation.

$$[\eta]=1.23\times10^{-4}\times(Mv)^{0.83}$$

(2) Hue of Aromatic Polycarbonate

The hue of an aromatic polycarbonate was measured as follows. A sheet having a thickness of 3 mm and 100 mm square was prepared by molding an aromatic polycarbonate using an injection molding machine (J100SS-2, a product of The Japan Steel Works, Ltd.) under conditions of a barrel temperature of 280° C. and a mold temperature of 90° C. Tristimulus value XYZ of the sheet which is an absolute value of color was measured with a color tester (SC-1-CH, a product of Suga Test Co., Ltd.), and YI value which is an indicator of yellowness was calculated with the following relational expression.

$$YI=(100/Y)\times(1.28X-1.06Z)$$

It is indicated that coloration increases with the increase of the YI value.

Example 1

A molten mixture was prepared by mixing diphenyl carbonate (DPC) and bisphenol A (BPA) in a constant molar ratio (DPC/BPA=1.060) in a nitrogen gas atmosphere.

Next, an aromatic polycarbonate was produced using a production apparatus comprising three vertical reactors and one horizontal reactor each being equipped with a stirrer, as explained in FIG. 1.

The molten mixture obtained above was continuously supplied to a first vertical reactor having a volume of 100 liters controlled to 220° C. and 1.33×10⁴ Pa at a flow rate of 88.7 kg/hr through a raw material introduction pipe. Liquid level was maintained constant in the first vertical reactor while controlling opening of a valve provided in a polymer discharge line at the bottom of the reactor such that an average residence time is 60 minutes.

Simultaneously with starting supply of the molten mixture to the first vertical reactor, a 1 wt % cesium carbonate aqueous solution as a catalyst was continuously supplied in a proportion of 0.4 μmol per mole of bisphenol A.

The molten reactant discharged from the bottom of the first vertical reactor was then continuously supplied to the second and third vertical reactors (inner volume: 100 liters) and the fourth horizontal reactor (inner volume: 150 liters), successively, and a polymer in a molten state was drawn out of a polymer discharge port at the bottom of the fourth horizontal reactor.

Next, the polymer in a molten state was introduced into a twin-screw extruder, and butyl p-toluene sulfonate (4 times molar amount to cesium carbonate used as a catalyst) was continuously supplied, followed by kneading. The resulting mixture was molded into a strand shape through a die, and cut with a cutter to obtain pellets (aromatic polycarbonate product).

Reaction conditions (molten reactant temperature, pressure and the number of stirring) in the second vertical reactor were 250° C., 2.00×10³ Pa and 75 rpm.

Further, the polymer discharged from the second vertical reactor had a viscosity average molecular weight (Mv) of 3,800.

The reaction conditions were set as follows such that the relationship between the molten reactant temperature T1 (° C.) in the third vertical reactor located at the end of three vertical reactors and the molten reactant temperature T2 (° C.) in the fourth horizontal reactor subsequent thereto is T2<T1. The reaction conditions were shown in the order of (molten reactant temperature (° C.), pressure (Pa) and the number of stirring (rpm)).

Third vertical reactor (T1: 272° C., 67 Pa and 75 rpm)
Fourth horizontal reactor (T2: 265° C., 140 Pa and 5 rpm)

Liquid level was controlled such that an average residence time in each reactor is 60 minutes, and at the same time, by-produced phenol was distilled.

When the production operation was continued for one month under the above conditions, formation of a high melting point product, and problems on operation such as clogging and/or stopping of a discharge gear pump based on such a formation were not generated.

Further, the polymer discharged from the third vertical reactor had a viscosity average molecular weight (Mv) of 7,000.

An aromatic polycarbonate product finally obtained had a viscosity average molecular weight (Mv) of 15,000 and hue of YI=1.3, and contamination with foreign matters was not observed.

Example 2

An aromatic polycarbonate was produced under the same conditions as in Example 1, except for setting the reaction conditions of the third vertical reactor to (T1: 282° C., 100 Pa and 75 rpm) and the reaction conditions in the fourth horizontal reactor to (T2: 275° C., 180 Pa and 5 rpm).

When the production operation was continued for one month under the above conditions, problems on operation were not generated similar to the case of Example 1, and stable production operation was conducted.

Further, the polymer discharged from the third vertical reactor had a viscosity average molecular weight (Mv) of 7,400.

An aromatic polycarbonate product finally obtained had a viscosity average molecular weight (Mv) of 15,200 and hue of YI=1.8, and contamination with foreign matters was not observed.

Comparative Example 1

An aromatic polycarbonate was produced under the same conditions as in Example 1, except for setting such that the molten reactant temperature T1 in the third vertical reactor is lower than the molten reactant temperature T2 in the fourth horizontal reactor (T2>T1).

The reaction conditions (molten reactant temperature (° C.), pressure (Pa) and the number of stirring (rpm)) in the third vertical reactor and the fourth horizontal reactor were as follows.

Third vertical reactor (T1: 258° C., 67 Pa and 75 rpm)
Fourth horizontal reactor (T2: 265° C., 100 Pa and 5 rpm)

When production operation was continued for one month under the above conditions, a high melting point product was formed in the third vertical reactor. Because the high melting point product entered in the molten reactant, the discharge gear pump of the third vertical reactor stopped two times. Further, an unmelted product (foreign matters) was observed in the aromatic polycarbonate produced.

Further, the polymer discharged from the third vertical reactor had a viscosity average molecular weight (Mv) of 6,100.

An aromatic polycarbonate product finally obtained had a viscosity average molecular weight (Mv) of 14,900 and hue of YI=1.3.

Comparative Example 2

An aromatic polycarbonate was produced under the same conditions as in Example 1, except for setting such that the molten reactant temperature T1 in the third vertical reactor equals to the molten reactant temperature T2 in the fourth horizontal reactor (T2=T1).

The reaction conditions (molten reactant temperature (° C.), pressure (Pa) and the number of stirring (rpm)) in the third vertical reactor and the fourth horizontal reactor were as follows.

Third vertical reactor (T1: 265° C., 67 Pa and 75 rpm)
Fourth horizontal reactor (T2: 265° C., 100 Pa and 5 rpm)

When production operation was continued for one month under the above conditions, a high melting point product was formed in the third vertical reactor. Because the high melting point product entered in the molten reactant, the discharge gear pump of the third vertical reactor stopped one time. Further, an unmelted product (foreign matters) was observed in the aromatic polycarbonate produced.

Further, the polymer discharged from the third vertical reactor had a viscosity average molecular weight (Mv) of 6,600.

An aromatic polycarbonate product finally obtained had a viscosity average molecular weight (Mv) of 15,300 and hue of YI=1.3. The results of Examples 1 and 2 and Comparative Examples 1 and 2 are shown in Table 1.

TABLE 1

| | | Example | | Comparative Example | |
|---|---|---|---|---|---|
| | | 1 | 2 | 1 | 2 |
| | DPC/BPA charging ratio (mol/mol) | 1.060 | 1.060 | 1.060 | 1.060 |
| | $Cs_2CO_3$ charging amount (μmol/BPA 1 mol) | 0.4 | 0.4 | 0.4 | 0.4 |
| First vertical reactor | Molten reactant temperature (° C.) | 220 | 220 | 220 | 220 |
| | Pressure (kPa) | 13.3 | 13.3 | 13.3 | 13.3 |
| Second vertical reactor | Molten reactant temperature (° C.) | 250 | 250 | 250 | 250 |
| | Pressure (kPa) | 2.0 | 2.0 | 2.0 | 2.0 |
| | Viscosity average molecular weight of polymer (Mv) | 3,800 | 3,800 | 3,800 | 3,800 |
| Third vertical reactor | Molten reactant temperature T1 (° C.) | 272 | 282 | 258 | 265 |
| | Pressure (kPa) | 67 | 100 | 67 | 67 |
| | Viscosity average molecular weight of polymer (Mv) | 7,000 | 7,400 | 6,100 | 6,600 |
| Fourth horizontal reactor | Molten reactant temperature T2 (° C.) | 265 | 275 | 265 | 265 |
| | Pressure (kPa) | 140 | 180 | 100 | 100 |
| | Viscosity average molecular weight of polymer (Mv) | 15,000 | 15,200 | 14,900 | 15,300 |
| | Hue of polymer (YI) | 1.3 | 1.8 | 1.3 | 1.3 |
| Remarks | Number of stopping of discharge gear pump in third vertical reactor (number/one month operation) | 0 | 0 | 2 | 1 |

It is seen from the results shown in Table 1 that in producing an aromatic polycarbonate using diphenyl carbonate (DPC) and bisphenol A (BPA) as raw materials and connecting three vertical reactors and one horizontal reactor in series, when the molten reactant temperature T1 (° C.) in the third vertical reactor located at the end of three vertical reactors is higher than the molten reactant temperature T2 (° C.) in the fourth horizontal reactor subsequent thereto (T2<T1), generation of a high melting point product in the third vertical reactor can be reduced (Examples 1 and 2).

In this case, when the viscosity average molecular weight (Mv) of the polymer in the third vertical reactor is from 4,000 to 14,000, the effect which can reduce generation of a high melting point product in the third vertical reactor is great.

Further, a viscosity average molecular weight (Mv) of the aromatic polycarbonate produced under such conditions is about 15,000, and a YI value showing hue is small. Therefore, such an aromatic polycarbonate can suitably be used as an optical polycarbonate.

Example 3

Production of an aromatic polycarbonate was conducted under the following conditions using the production apparatus comprising two raw material mixing tanks, three vertical reactors and one horizontal reactor as shown in FIG. 1.

First, in a raw material preparation step, a molten mixture of raw materials of DPC/BPA was prepared by mixing DPC (diphenyl carbonate) and BPA (bisphenol A) in a constant molar ratio (DPC/BPA=1.040) in a nitrogen gas atmosphere.

Subsequently, in a polycondensation step, the molten mixture of raw materials was continuously supplied to the first vertical reactor 6a having an inner volume of 130 liters (diameter: 450 mm, and evaporation surface area: 0.16 m$^2$) equipped with MAXBLEND blade 7a through a transfer piping at a flow rate of 106.4 kg/hr.

The inside of the first vertical reactor 6a was maintained at a temperature of 222° C. under a pressure of 13.33 KPa (100 Torr). The stirring power per unit volume was controlled to 0.8 kW/m$^3$ (the number of revolutions of blade: 200 rpm), and the evaporation surface area per unit treatment amount was controlled 2.7 m$^2$·hr/m$^3$.

Further, liquid level was maintained constant such that the average residence time of the molten reactant is 6.0 minutes while controlling opening of a valve provided in a polymer discharge line at the bottom of the reactor.

Next, simultaneously with starting supply of the molten mixture of raw materials, a cesium carbonate aqueous solution (concentration: 8.06×10$^{-2}$ wt %) as an ester exchange catalyst was continuously supplied to the first vertical reactor 6a through the catalyst introduction pipe 5b. The supply flow rate is 100 g/hr (1×10$^{-6}$ mol per mole of bisphenol A). A limiting viscosity [η] of the molten reactant discharged from the bottom of the first vertical reactor 6a was 0.06 dl/g.

Subsequently, the molten reactant discharged from the first vertical reactor 6a was continuously supplied to the second vertical reactor 6b, the third vertical reactor 6c and the fourth horizontal reactor 9a, connected to the first vertical reactor 6a in series, successively. The second vertical reactor 6b is provided with MAXBLEND blade 7b, the third vertical reactor 6c is provided with MAXBLEND blade 7c, and the fourth horizontal reactor 9a is provided with a lattice-type blade 10a. The degree of filling of the molten reactant in the fourth horizontal reactor 9a was about 20%.

Further, the second vertical reactor 6b and the third vertical reactor 6c have a volume of 130 liters, and the fourth horizontal reactor 9a has a volume 280 liters (evaporation surface area: 0.59 m$^2$).

The aromatic polycarbonate drawn out of the polymer discharge port of the fourth horizontal reactor 9a was devolatilized using the extruder 11a, cooled and pelletized.

Operation conditions in the first vertical reactor 6a, the second vertical reactor 6b and the third vertical reactor 6c, and the limiting viscosity ([η]) measured on the molten reactant in each reactor after 30 hours from the initiation of operation are shown below.

The operation conditions were shown in the order of temperature (° C.) of a reactor, pressure (Torr) of a reactor, average residence time (minute), stirring power per unit volume (kW/m$^3$) in a reactor, and an evaporation surface area per unit treatment amount (m$^2$·hr/m$^3$) in a reactor.

(First Vertical Reactor 6a)

Operation conditions: 220° C., 100 Torr, 60 minutes, 0.8 kW/m$^3$ (160 rpm), 2.7 m$^2$·hr/m$^3$ Limiting viscosity: [η]=0.06 dl/g (Second Vertical Reactor 6b)

Operation conditions: 240° C., 15 Torr, 60 minutes, 0.8 kW/m$^3$ (100 rpm), 2.7 m$^2$·hr/m$^3$.

Limiting viscosity: [η]=0.16 dl/g (Third Vertical Reactor 6c)

Operation conditions: 270° C., 0.5 Torr, 60 minutes, 4.2 kW/m$^3$ (60 rpm), 2.7 m$^2$·hr/m$^3$ Limiting viscosity: [η]=0.30 dl/g Operation conditions (shown in the order of temperature (° C.) of a reactor, and pressure (Torr) of a reactor, average residence time (minute), the number of revolutions (rpm) of a lattice-type blade 10a, and an evaporation surface area per unit treatment amount (m$^2$·hr/m$^3$) in a reactor) in the fourth horizontal reactor 9a, and a viscosity average molecular weight (Mv) and a hue (yellowness: YI) of a pelletized aromatic polycarbonate were as follows. The target value of a viscosity average molecular weight (Mv) of an aromatic polycarbonate was from 22,000 to 23,000.

(Fourth Horizontal Reactor 9a)

Operation conditions: 280° C., 0.5 Torr, 60 minutes, 5 rpm, 10.0 m$^2$·hr/m$^3$

Viscosity average molecular weight (Mv)=22,100

Hue of product polymer (yellowness: YI)=1.5

Example 4

In Example 3, the supply rate of the molten mixture of raw materials (BPA/DPC) was changed to 71.0 kg/hr, the supply rate of the cesium carbonate aqueous solution was changed to 66 g/hr, and the average residence time in each reactor of the first vertical reactor 6a, the second vertical reactor 6b and the third vertical reactor 6c was changed to 90 minutes, respectively.

The degree of filling of the molten reactant in the fourth horizontal reactor 9a was changed to about 25%, and the average residence time in the fourth horizontal reactor 9a was changed to 120 minutes. The operation conditions other than the above were set to the same conditions as in Example 1, and an aromatic polycarbonate was produced.

Operation conditions in the first vertical reactor 6a, the second vertical reactor 6b and the third vertical reactor 6c, and the limiting viscosity ([η]) measured on the molten reactant in each reactor after 30 hours from the initiation of operation are shown below.

Similar to Example 1, the operation conditions were shown in the order of temperature (° C.) of a reactor, pressure (Torr) of a reactor, average residence time (minute), stirring power per unit volume (kW/m$^3$) in a reactor, and an evaporation surface area per unit treatment amount (m$^2$·hr/m$^3$) in a reactor.

(First Vertical Reactor 6a)

Operation conditions: 220° C., 100 Torr, 90 minutes, 0.8 kW/m$^3$ (160 rpm), 4.0 m$^2$·hr/m$^3$ Limiting viscosity: [η]=0.06 dl/g (Second Vertical Reactor 6b)

Operation conditions: 245° C., 15 Torr, 90 minutes, 0.8 kW/m$^3$ (100 rpm), 4.0 m$^2$·hr/m$^3$ Limiting viscosity: [η]=0.16 dl/g (Third Vertical Reactor 6c)
  Operation conditions: 270° C., 0.5 Torr, 90 minutes, 4.2 kW/m$^3$ (60 rpm), 4.0 m$^2$·hr/m$^3$
  Limiting viscosity: [η]=0.33 dl/g
  Operation conditions (shown in the order of temperature (° C.) of a reactor, and pressure (Torr) of a reactor, average residence time (minute), the number of revolutions (rpm) of a lattice-type blade 10a, and an evaporation surface area per unit treatment amount (m$^2$·hr/m$^3$) in a reactor) in the fourth horizontal reactor 9a, and a viscosity average molecular weight (Mv) and a hue (yellowness: YI) of a pelletized aromatic polycarbonate were as follows.

(Fourth Horizontal Reactor 9a)
  Operation conditions: 280° C., 0.5 Torr, 60 minutes, 5 rpm, 15.0 m$^2$·hr/m$^3$
  Viscosity average molecular weight (Mv)=22,400
  Hue of product polymer (yellowness: YI)=1.7

Example 5

In Example 3, the supply rate of the molten mixture of raw materials (BPA/DPC) was changed to 212.9 kg/hr, the supply rate of the cesium carbonate aqueous solution was changed to 200 g/hr, and the average residence time in each reactor of the first vertical reactor 6a, the second vertical reactor 6b and the third vertical reactor 6c was changed to 30 minutes, respectively.

The degree of filling of the molten reactant in the fourth horizontal reactor 9a was changed to about 40%, and the average residence time in the fourth horizontal reactor 9a was changed to 60 minutes. The operation conditions other than the above were set to the same conditions as in Example 1, and an aromatic polycarbonate was produced.

Operation conditions in the first vertical reactor 6a, the second vertical reactor 6b and the third vertical reactor 6c, and the limiting viscosity ([η]) measured on the molten reactant in each reactor after 30 hours from the initiation of operation are shown below.

Similar to Example 1, the operation conditions were shown in the order of temperature (° C.) of a reactor, pressure (Torr) of a reactor, average residence time (minute), stirring power per unit volume (kW/m$^3$) in a reactor, and an evaporation surface area per unit treatment amount (m$^2$·hr/m$^3$) in a reactor.

(First Vertical Reactor 6a)
  Operation conditions: 220° C., 100 Torr, 30 minutes, 0.8 kW/m$^3$ (160 rpm), 1.3 m$^2$·hr/m$^3$
  Limiting viscosity: [η]=0.06 dl/g (Second Vertical Reactor 6b)
  Operation conditions: 245° C., 15 Torr, 30 minutes, 0.8 kW/m$^3$ (100 rpm), 1.3 m$^2$·hr/m$^3$
  Limiting viscosity: [η]=0.15 dl/g (Third Vertical Reactor 6c)
  Operation conditions: 270° C., 0.5 Torr, 30 minutes, 4.2 kW/m$^3$ (60 rpm), 1.3 m$^2$·hr/m$^3$
  Limiting viscosity: [η]=0.30 dl/g
  Operation conditions (shown in the order of temperature (° C.) of a reactor, and pressure (Torr) of a reactor, average residence time (minute), the number of revolutions (rpm) of a lattice-type blade 10a, and an evaporation surface area per unit treatment amount (m$^2$·hr/m$^3$) in a reactor) in the fourth horizontal reactor 9a, and a viscosity average molecular weight (Mv) and a hue (yellowness: YI) of a pelletized aromatic polycarbonate were as follows.

(Fourth Horizontal Reactor 9a)
  Operation conditions: 280° C., 0.5 Torr, 60 minutes, 5 rpm, 5.0 m$^2$·hr/m$^3$
  Viscosity average molecular weight (Mv)=22,000
  Hue of product polymer (yellowness: YI)=1.5

Comparative Example 3

In Example 3, the supply rate of the molten mixture of raw materials (BPA/DPC) was changed to 312.6 kg/hr, the supply rate of the cesium carbonate aqueous solution was changed to 294 g/hr, the average residence time in each reactor of the first vertical reactor 6a, the second vertical reactor 6b and the third vertical reactor 6c was changed to 30 minutes, respectively, and the number of revolutions of blade was increased.

The degree of filling of the molten reactant in the fourth horizontal reactor 9a was changed to about 40%, and the average residence time in the fourth horizontal reactor 9a was changed to 40 minutes. The operation conditions other than the above were set to the same conditions as in Example 1, and an aromatic polycarbonate was produced.

Operation conditions in the first vertical reactor 6a, the second vertical reactor 6b and the third vertical reactor 6c, and the limiting viscosity ([η]) measured on the molten reactant in each reactor after 30 hours from the initiation of operation are shown below.

Similar to Example 1, the operation conditions were shown in the order of temperature (° C.) of a reactor, pressure (Torr) of a reactor, average residence time (minute), stirring power per unit volume (kW/m$^3$) in a reactor, and an evaporation surface area per unit treatment amount (m$^2$·hr/m$^3$) in a reactor.

(First Vertical Reactor 6a)
  Operation conditions: 220° C., 100 Torr, 30 minutes, 0.8 kW/m$^3$ (186 rpm), 0.9 m$^2$·hr/m$^3$
  Limiting viscosity: [η]=0.06 dl/g (Second Vertical Reactor 6b)
  Operation conditions: 245° C., 15 Torr, 30 minutes, 0.8 kW/m$^3$ (116 rpm), 0.9 m$^2$·hr/m$^3$
  Limiting viscosity: [η]=0.14 dl/g (Third Vertical Reactor 6c)
  Operation conditions: 270° C., 0.5 Torr, 30 minutes, 4.2 kW/m$^3$ (70 rpm), 0.9 m$^2$·hr/m$^3$
  Limiting viscosity: [η]=0.28 dl/g
  Operation conditions (shown in the order of temperature (° C.) of a reactor, and pressure (Torr) of a reactor, average residence time (minute), the number of revolutions (rpm) of a lattice-type blade 10a, and evaporation surface area per unit treatment amount (m$^2$·hr/m$^3$) in a reactor) in the fourth horizontal reactor 9a, and a viscosity average molecular weight (Mv) and hue (yellowness: YI) of a pelletized aromatic polycarbonate were as follows.

(Fourth Horizontal Reactor 9a)
  Operation conditions: 280° C., 0.5 Torr, 60 minutes, 5 rpm, 3.4 m$^2$·hr/m$^3$
  Viscosity average molecular weight (Mv)=20,100
  Hue of product polymer (yellowness: YI)=1.6

Thus, it is seen that in the production of an aromatic polycarbonate by a melt process by connecting three vertical reactors in series, when the evaporation surface area per unit treatment amount in the third vertical reactor 6c is particularly under the condition of less than 1.0 m$^2$·hr/m$^3$ (0.9 m$^2$·hr/m$^3$), the viscosity average molecular weight (Mv) of a product polymer finally obtained does not reach the target value (22,000 to 23,000).

When the temperature at the polymer discharge part of the fourth horizontal reactor 9a was elevated to 285° C. in order to increase the molecular weight of the product polymer and the production operation was conducted, the hue (yellowness: YI) of the product polymer further deteriorated to 2.2.

Comparative Example 4

In Example 1, the supply rate of the molten mixture of raw materials (BPA/DPC) was changed to 53.2 kg/hr, the supply rate of the cesium carbonate aqueous solution was changed to 50 g/hr, and the average residence time in each reactor of the first vertical reactor 6a, the second vertical reactor 6b and the third vertical reactor 6c was changed to 120 minutes, respectively.

The degree of filling of the molten reactant in the fourth horizontal reactor 9a was changed to about 30%, and the average residence time in the fourth horizontal reactor 9a was changed to 40 minutes. The operation conditions other than the above were set to the same conditions as in Example 1, and an aromatic polycarbonate was produced.

Operation conditions in the first vertical reactor 6a, the second vertical reactor 6b and the third vertical reactor 6c, and the limiting viscosity ([η]) measured on the molten reactant in each reactor after 30 hours from the initiation of operation are shown below.

Similar to Example 3, the operation conditions were shown in the order of temperature (° C.) of a reactor, pressure (Torr) of a reactor, average residence time (minute), stirring power (kW/m$^3$) per unit volume in a reactor, and evaporation surface area (m$^2$·hr/m$^3$) per unit treatment amount in a reactor.

(First Vertical Reactor 6a)
Operation conditions: 220° C., 100 Torr, 120 minutes, 0.8 kW/m$^3$ (160 rpm), 5.3 m$^2$·hr/m$^3$
Limiting viscosity: [η]=0.06 dl/g (Second Vertical Reactor 6b)
Operation conditions: 245° C., 15 Torr, 120 minutes, 0.8 kW/m$^3$ (100 rpm), 5.3 m$^2$·hr/m$^3$
Limiting viscosity: [η]=0.16 dl/g (Third Vertical Reactor 6c)
Operation conditions: 270° C., 0.5 Torr, 120 minutes, 0.8 kW/m$^3$ (70 rpm), 0.9 m$^2$·hr/m$^3$
Limiting viscosity: [η]=0.31 dl/g Operation conditions (shown in the order of temperature (° C.) of a reactor, and pressure (Torr) of a reactor, average residence time (minute), the number of revolutions (rpm) of a lattice-type blade 10a, and evaporation surface area per unit treatment amount (m$^2$·hr/m$^3$) in a reactor) in the fourth horizontal reactor 9a, and a viscosity average molecular weight (Mv) and hue (yellowness: YI) of a pelletized aromatic polycarbonate were as follows.

(Fourth Horizontal Reactor 9a)
Operation conditions: 280° C., 0.5 Torr, 40 minutes, 5 rpm, 20.0 m$^2$·hr/m$^3$
Viscosity average molecular weight (Mv)=22,300
Hue of product polymer (yellowness: YI)=2.4

Thus, it is seen that in the production of an aromatic polycarbonate by a melt process by connecting three vertical reactors in series, when the operation is conducted under the condition that the average residence time in each reactor exceeds 90 minutes, the hue (yellowness: YI) of the product polymer finally obtained deteriorates to 2.42. The results of Examples 3 to 5 are shown in Table 2. The results of Comparative Example 3 and Comparative Example 4 are shown in Table 3.

TABLE 2

| | Reactor | Temperature (° C.) | Pressure (Torr) | Average residence time (min) | Stirring power (kW/m$^3$) | Evaporation surface area (m$^2$·hr/m$^3$) | Molten reactant [η] (dl/g) | Aromatic polycarbonate Viscosity average molecular weight Mv (Target value) | Yellowness YI |
|---|---|---|---|---|---|---|---|---|---|
| Example 3 | First vertical | 220 | 100 | 60 | 0.8 | 2.7 | 0.06 | 22,100 | 1.5 |
| | Second vertical | 240 | 15 | 60 | 0.8 | 2.7 | 0.16 | (22,000 to | |
| | Third vertical | 270 | 0.5 | 60 | 4.2 | 2.7 | 0.30 | 23,000) | |
| | Fourth horizontal | 280 | 0.5 | 60 | — | 10.0 | — | | |
| Example 4 | First vertical | 220 | 100 | 90 | 0.8 | 4.0 | 0.06 | 22,400 | 1.7 |
| | Second vertical | 245 | 15 | 90 | 0.8 | 4.0 | 0.16 | (22,000 to | |
| | Third vertical | 270 | 0.5 | 90 | 4.2 | 4.0 | 0.33 | 23,000) | |
| | Fourth horizontal | 280 | 0.5 | 60 | — | 15.0 | — | | |
| Example 5 | First vertical | 220 | 100 | 30 | 0.8 | 1.3 | 0.06 | 22,000 | 1.5 |
| | Second vertical | 245 | 15 | 30 | 0.8 | 1.3 | 0.16 | (22,000 to | |
| | Third vertical | 270 | 0.5 | 30 | 4.2 | 1.3 | 0.30 | 23,000) | |
| | Fourth horizontal | 280 | 0.5 | 60 | — | 5.0 | — | | |

TABLE 3

| | Reactor | Temperature (° C.) | Pressure (Torr) | Average residence time (min) | Stirring power (kW/m$^3$) | Evaporation surface area (m$^2$·hr/m$^3$) | Molten reactant [η] (dl/g) | Aromatic polycarbonate Viscosity average molecular weight Mv (Target value) | Yellowness YI |
|---|---|---|---|---|---|---|---|---|---|
| Comparative Example 3 | First vertical | 220 | 100 | 30 | 0.8 | 0.9 | 0.06 | 20,100 | 1.6 |
| | Second vertical | 245 | 15 | 30 | 0.8 | 0.9 | 0.14 | (22,000 to 23,000) | |
| | Third vertical | 270 | 0.5 | 30 | 4.2 | 0.9 | 0.28 | | |
| | Fourth horizontal | 280 | 0.5 | 60 | — | 3.4 | — | | |
| Comparative Example 4 | First vertical | 220 | 100 | 120 | 0.8 | 5.3 | 0.06 | 22,300 | 2.4 |
| | Second vertical | 245 | 15 | 120 | 0.8 | 5.3 | 0.16 | (22,000 to 23,000) | |
| | Third vertical | 270 | 0.5 | 120 | 0.8 | 0.9 | 0.31 | | |
| | Fourth horizontal | 280 | 0.5 | 40 | — | 20.0 | — | | |

From the results shown in Tables 2 and 3, according to the production method of an aromatic polycarbonate to which the present embodiment is applied, a high molecular weight aromatic polycarbonate having excellent hue can be produced.

The aromatic polycarbonate thus obtained can suitably be used to construction materials such as sheets, containers such as water bottles, optical lenses such as automobile head light lamps and spectacles, optical recording materials such as optical discs, and light guide plates such as liquid crystal displays.

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2006-202042) filed Jul. 25, 2006 and Japanese Patent Application (Patent Application No. 2006-212971) filed Aug. 4, 2006, the entire contents thereof being hereby incorporated by reference.

INDUSTRIAL APPLICABILITY

According to the present invention, an aromatic polycarbonate containing a reduced amount of a high melting point material can be produced. Further, a high molecular weight aromatic polycarbonate having excellent hue can be produced by a melt process. Therefore, the industrial value of the present invention is remarkable.

The invention claimed is:

1. A method of producing an aromatic polycarbonate, comprising:
reacting an aromatic dihydroxy compound and a carbonic diester in plural reactors,
wherein a molten reactant temperature T1 (° C.) in at least one vertical reactor A and a molten reactant temperature T2 (° C.) in a reactor B subsequent to the reactor A satisfy the following formula (1):

T2<T1  Formula (1).

2. The method claimed in claim 1, wherein the molten reactant temperature (T1) (° C.) and the molten reactant temperature T2 (° C.) further satisfy the following formula (2):

260° C.<T2<T1<280° C.  Formula (2).

3. The method claimed in claim 1, wherein the vertical reactor is connected to the end of the plural reactors connected in series, and the reactor subsequent to the vertical reactor is a horizontal reactor.

4. The method claimed in claim 1, wherein a polymer formed by the reacting in the reactor A has a viscosity average molecular weight of from 4,000 to 14,000;
wherein the limiting viscosity ($\eta$) is determined in methylene chloride at 20° C. in an Ubbellodhe viscometer as an intercept when a linear concentration (C) obtained by plotting a specific viscosity ($\eta_{sp}/C$) of a methylene chloride diluted solution at 20° C. and a concentration (C) of the methylene chloride solution is extrapolated to zero; and
wherein viscosity average molecular weight is calculated from $\eta=1.23\times10^{-4}$ $(Mv)^{0.83}$.

5. The method claimed in claim 1, wherein the reacting is carried out to form an aromatic polycarbonate having a viscosity average molecular weight of 10,000 or more;
wherein the limiting viscosity ($\eta$) is determined in methylene chloride at 20° C. in an Ubbellodhe viscometer as an intercept when a linear concentration (C) obtained by plotting a specific viscosity ($\eta_{sp}/C$) of a methylene chloride diluted solution at 20° C. and a concentration (C) of the methylene chloride solution is extrapolated to zero; and
wherein viscosity average molecular weight is calculated from $\eta=1.23\times10^{-4}$ $(Mv)^{0.83}$.

6. A method of producing an aromatic polycarbonate, comprising:
melt polycondensing an aromatic dihydroxy compound and a carbonic diester in an ester exchange reaction in a plurality of reactors equipped with a stirring device,
wherein an evaporation surface area per unit treatment amount of a molten reactant comprising the aromatic dihydroxy compound and the carbonic diester in a reactor to which the molten reactant having a limiting viscosity ($\eta$) of 0.1 dl/g or more is supplied, is 1.0 m²·hr/m³ or more;
wherein the limiting viscosity ($\eta$) is determined in methylene chloride at 20° C. in an Ubbellodhe viscometer as an intercept when a linear concentration (C) obtained by plotting a specific viscosity ($\eta_{sp}/C$) of a methylene chloride diluted solution at 20° C. and a concentration (C) of the methylene chloride solution is extrapolated to zero.

7. The method of claim 6, wherein at least one of the reactors to which the molten reactant is supplied is a vertical reactor.

8. The method claimed in claim 7, wherein the vertical reactor further satisfies the following conditions (1) and (2):
(1) an average residence time of the molten reactant in the reactor is within 120 minutes, and
(2) a stirring power per unit volume added to the molten reactant in the reactor is 2.0 kW/m³ or more.

9. The method claimed in claim 6, wherein the reactors comprise:
a plurality of the vertical reactors connected in series, and
at least one horizontal reactor subsequent to the vertical reactors.

10. The method claimed in claim 8, wherein the average residence time of the molten reactant in the horizontal reactor is within 120 minutes, and an evaporation surface area per unit treatment amount of the molten reactant in the horizontal reactor is 4.0 m²·hr/m³ or more.

11. The method claimed in claim 6, wherein the reacting is carried out to form an aromatic polycarbonate having a viscosity average molecular weight of 10,000 or more.

12. The method of claim 1, wherein the reactant temperatures T2 and T1 satisfy the following formula:

272° C.<T2<T1<282.

13. The method of claim 1, wherein the reactant temperatures T2 and T1 satisfy the following formula:

265<T2<T1≦272° C.

14. The method as claimed in claim 1, wherein the reacting is first carried out in three vertical reactors each equipped with a stirring blade and each connected in series and then carried out in the horizontal reactor.

15. The method as claimed in claim 1, wherein the last reactor in which the reacting is carried out is a horizontal reactor.

16. The method of claim 6, wherein the reactant temperatures T2 and T1 satisfy the following formula:

272° C.<T2<T1<282.

17. The method as claimed in claim 6, wherein the reactant temperatures T2 and T1 satisfy the following formula:

265<T2<T1≦272° C.

18. The method as claimed in claim 6, wherein the reacting is first carried out in three vertical reactors each equipped with a stirring blade and each connected in series, and then carried out in a horizontal reactor.

19. The method as claimed in claim 6, wherein the last reactor in which the reacting is carried out is a horizontal reactor.

20. The method as claimed in claim 1, wherein the reacting is carried out at a molten reactant temperature at which the aromatic dihydroxy compound and the carbonic diester are molten.

* * * * *